(12) United States Patent
Onitsuka et al.

(10) Patent No.: US 6,745,341 B1
(45) Date of Patent: Jun. 1, 2004

(54) INFORMATION PROCESSING APPARATUS HAVING FAULT DETECTION FOR MULTIPLEX STORAGE DEVICES

(75) Inventors: Shinichi Onitsuka, Kawasaki (JP);
Toshinori Hiraishi, Kawasaki (JP);
Akihiko Hisada, Kawasaki (JP);
Noriaki Shimizu, Kawasaki (JP);
Noboru Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/452,092

(22) Filed: Nov. 30, 1999

(30) Foreign Application Priority Data

Mar. 30, 1999 (JP) .......................................... 11-087456

(51) Int. Cl.[7] .............................................. G06F 11/00
(52) U.S. Cl. ................................. 714/7; 714/10; 714/6
(58) Field of Search .............................. 714/10, 13, 6, 714/11, 7

(56) References Cited

U.S. PATENT DOCUMENTS 3,814,919 A * 6/1974 Repton et al. ................. 714/25
5,123,099 A * 6/1992 Shibata et al. ................ 711/120
5,761,413 A * 6/1998 Frank et al. ................... 714/49
6,038,680 A * 3/2000 Olarig ............................ 714/6

FOREIGN PATENT DOCUMENTS

JP 58070495 4/1983
JP 2000-285030 10/2000

* cited by examiner

Primary Examiner—Nadeem Iqbal
Assistant Examiner—Timothy M Bonura
(74) Attorney, Agent, or Firm—Greer, Burns & Crain, Ltd.

(57) ABSTRACT

An information processing apparatus having a plurality of CPUs has increased reliability. When one of storage devices suffers a fault, a corresponding control device indicates the fault to other control devices, so that all the control devices can recognize the fault. When either one of the CPUs has accessed the storage device, the control device indicates the occurrence of the fault to the CPU. Upon reception of the indication of the occurrence of the fault, the CPU changes the storage device for an active system, if necessary, according to predetermined rules. The same processing is performed when other CPUs have accessed the storage device. As a result, when all the CPUs have accessed the storage device, the setting up of the active system is completed.

6 Claims, 9 Drawing Sheets

| STORAGE DEVICE 10 | STORAGE DEVICE 11 | STORAGE DEVICE 12 | STORAGE DEVICE 13 | CONVERTED VALUE | NEW ACTIVE SYSTEM STORAGE DEVICE |
|---|---|---|---|---|---|
| CONNECTABLE | CONNECTABLE | CONNECTABLE | CONNECTABLE | 1111 | 10 |
| CONNECTABLE | CONNECTABLE | CONNECTABLE | NON-CONNECTABLE | 1110 | 10 |
| CONNECTABLE | CONNECTABLE | NON-CONNECTABLE | CONNECTABLE | 1101 | 10 |
| CONNECTABLE | CONNECTABLE | NON-CONNECTABLE | NON-CONNECTABLE | 1100 | 10 |
| CONNECTABLE | NON-CONNECTABLE | CONNECTABLE | CONNECTABLE | 1011 | 12 |
| CONNECTABLE | NON-CONNECTABLE | CONNECTABLE | NON-CONNECTABLE | 1010 | 10 |
| CONNECTABLE | NON-CONNECTABLE | NON-CONNECTABLE | CONNECTABLE | 1001 | 10 |
| CONNECTABLE | NON-CONNECTABLE | NON-CONNECTABLE | NON-CONNECTABLE | 1000 | 10 |
| NON-CONNECTABLE | CONNECTABLE | CONNECTABLE | CONNECTABLE | 0111 | 12 |
| NON-CONNECTABLE | CONNECTABLE | CONNECTABLE | NON-CONNECTABLE | 0110 | 12 |
| NON-CONNECTABLE | CONNECTABLE | NON-CONNECTABLE | CONNECTABLE | 0101 | 13 |
| NON-CONNECTABLE | CONNECTABLE | NON-CONNECTABLE | NON-CONNECTABLE | 0100 | 11 |
| NON-CONNECTABLE | NON-CONNECTABLE | CONNECTABLE | CONNECTABLE | 0011 | 12 |
| NON-CONNECTABLE | NON-CONNECTABLE | CONNECTABLE | NON-CONNECTABLE | 0010 | 12 |
| NON-CONNECTABLE | NON-CONNECTABLE | NON-CONNECTABLE | CONNECTABLE | 0001 | 13 |

| STORAGE DEVICE 10 | STORAGE DEVICE 11 | STORAGE DEVICE 12 | STORAGE DEVICE 13 | CONVERTED VALUE | NEW ACTIVE SYSTEM STORAGE DEVICE |
|---|---|---|---|---|---|
| CONNECTED | CONNECTED | CONNECTED | UNCONNECTED | 1110 | 12 |
| CONNECTED | CONNECTED | UNCONNECTED | CONNECTED | 1101 | 13 |
| CONNECTED | CONNECTED | UNCONNECTED | UNCONNECTED | 1100 | 10 |
| CONNECTED | UNCONNECTED | CONNECTED | CONNECTED | 1011 | 12 |
| CONNECTED | UNCONNECTED | CONNECTED | UNCONNECTED | 1010 | 12 |
| CONNECTED | UNCONNECTED | UNCONNECTED | CONNECTED | 1001 | 13 |
| CONNECTED | UNCONNECTED | UNCONNECTED | UNCONNECTED | 1000 | 11 |
| UNCONNECTED | CONNECTED | CONNECTED | CONNECTED | 0111 | 12 |
| UNCONNECTED | CONNECTED | CONNECTED | UNCONNECTED | 0110 | 12 |
| UNCONNECTED | CONNECTED | UNCONNECTED | CONNECTED | 0101 | 13 |
| UNCONNECTED | CONNECTED | UNCONNECTED | UNCONNECTED | 0100 | 11 |
| UNCONNECTED | UNCONNECTED | CONNECTED | CONNECTED | 0011 | 12 |
| UNCONNECTED | UNCONNECTED | CONNECTED | UNCONNECTED | 0010 | 12 |
| UNCONNECTED | UNCONNECTED | UNCONNECTED | CONNECTED | 0001 | 13 |

FIG. 7

|  | FAULT ||||||
|---|---|---|---|---|---|---|
|  |  | 1ST STORAGE DEVICE || 2ND STORAGE DEVICE || 3RD STORAGE DEVICE |
|  |  | RESULT |  | RESULT |  | RESULT |
| LOOO | → | ×OLO | → | ××LO | → | ×××L |
|  |  |  |  |  | ↘ | ××L× |
|  |  |  | ↘ | ×O×L | → | ×××L |
|  |  |  |  |  | ↘ | ×L×× |
|  |  |  | ↘ | ×OL× | → | ××L× |
|  |  |  |  |  | ↘ | ×L×× |
|  | ↘ | L×OO | → | ××LO | → | ×××L |
|  |  |  |  |  | ↘ | ××L× |
|  |  |  | ↘ | L××O | → | ×××L |
|  |  |  |  |  | ↘ | L××× |
|  |  |  | ↘ | L×O× | → | ××L× |
|  |  |  |  |  | ↘ | L××× |
|  | ↘ | LO×O | → | ×O×L | → | ×××L |
|  |  |  |  |  | ↘ | ×L×× |
|  |  |  | ↘ | L××O | → | ×××L |
|  |  |  |  |  | ↘ | L××× |
|  |  |  | ↘ | LO×× | → | ×L×× |
|  |  |  |  |  | ↘ | L××× |
|  | ↘ | LOO× | → | ×OL× | → | ×××L |
|  |  |  |  |  | ↘ | ×L×× |
|  |  |  | ↘ | L×O× | → | ××L× |
|  |  |  |  |  | ↘ | L××× |
|  |  |  | ↘ | LO×× | → | ×L×× |
|  |  |  |  |  | ↘ | L××× |

INFORMATION PROCESSING APPARATUS HAVING FAULT DETECTION FOR MULTIPLEX STORAGE DEVICES

BACKGROUND OF THE INVENTION

1. Field of the Invention

The present invention relates to an information processing apparatus, and more particularly to an information processing apparatus having a plurality of nodes each having at least one CPU and a plurality of multiplex storage devices.

2. Description of the Related Art

In information processing apparatus having a plurality of nodes each having a CPU and a memory and storage devices connected to the nodes, the storage devices are often arranged in a duplex configuration for increased reliability.

Specifically, two storage devices which store the same data are connected to a plurality of nodes, and either one of the storage devices is used in an active system. If the storage device in the active system suffers a fault, then the other storage device switches to the active system, so that any trouble due to the failure of the storage device can be prevented from happening.

However, if either one of the storage devices is subjected to a failure, then the information processing apparatus needs to operate in the absence of a backup system until the repair of the faulty storage device is completed. As a result, the reliability of the information processing apparatus is lowered.

One solution would be to increase the multiplex level of storage devices. In the conventional system which uses the duplex storage devices, when one of the storage devices suffers a fault, the other storage device is simply selected. A multiplex level equal to or higher than a triplex level cannot be achieved simply by expanding the conventional system.

SUMMARY OF THE INVENTION

It is therefore an object of the present invention to provide an information processing apparatus having storage devices with an increased multiplex level for higher reliability.

To achieve the above object, there is provided in accordance with the present invention an information processing apparatus having a plurality of nodes each having at least one CPU and multiplex storage devices, comprising memory means associated with each of the CPUs for storing information indicating that each of the multiplex storage devices is either an active system, a backup system, or unconnected, access means for accessing the memory means depending on information stored in the memory means, fault detecting means for detecting when a fault occurs in each of the multiplex storage devices, fault indicating means for indicating the occurrence of a fault to a CPU if the fault detecting means detects the occurrence of the fault and the CPU has accessed the fault indicating means, and updating means for updating information stored in the memory means according to predetermined rules if the fault indicating means has indicated the occurrence of the fault.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
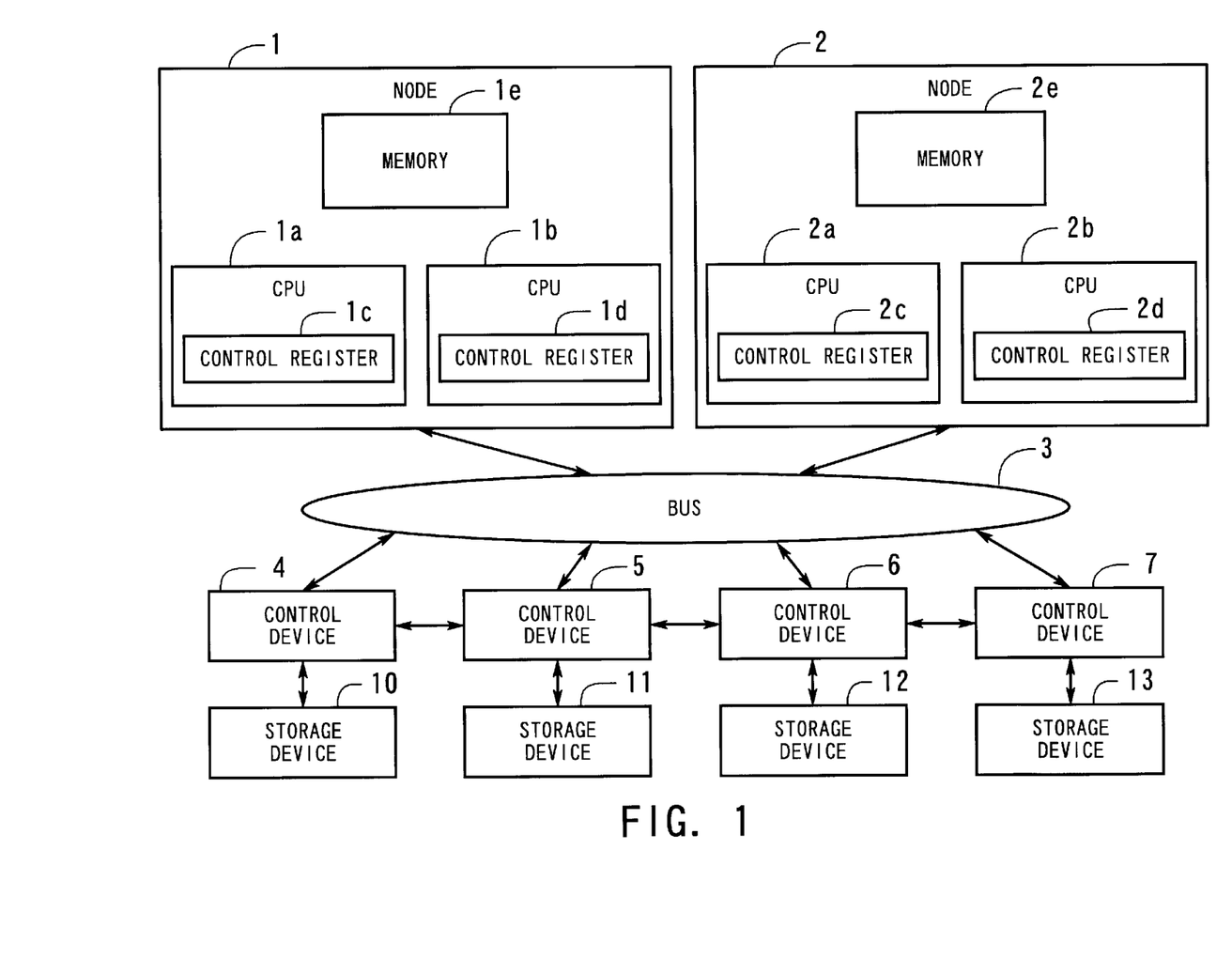
FIG. 1 is a block diagram of an information processing apparatus according to the present invention.

FIG. 1 shows in block form an information processing apparatus according to the present invention. As shown in FIG. 1, the information processing apparatus comprises nodes 1, 2 and control devices 4–7 which are connected to each other by a bus 3. Storage devices 10–13 are connected respectively to the control devices 4–7.

The components of the information processing apparatus will be described in detail below. First, the nodes will be described below. Since the nodes 1, 2 are identical in structure to each other, only the node 1 will be described below.

The node 1 comprises a pair of CPUs $1a$, $1b$, a memory $1e$, and a pair of control registers $1c$, $1d$. The CPUs $1a$, $1b$ read programs, data, etc. stored in the storage devices 10–13 via the control devices 4–7 and the bus 3, store the read programs, data, etc. in the memory $1e$, and execute various processes according to the read programs.

The memory $1e$, which comprises a semiconductor memory, stores a basic program (e.g., an IPL (Initial Program Loader)) to be executed by the CPUs $1a$, $1b$ and data, and also temporarily stores programs, data, etc. read from the storage devices 10–13.

Figure 2:
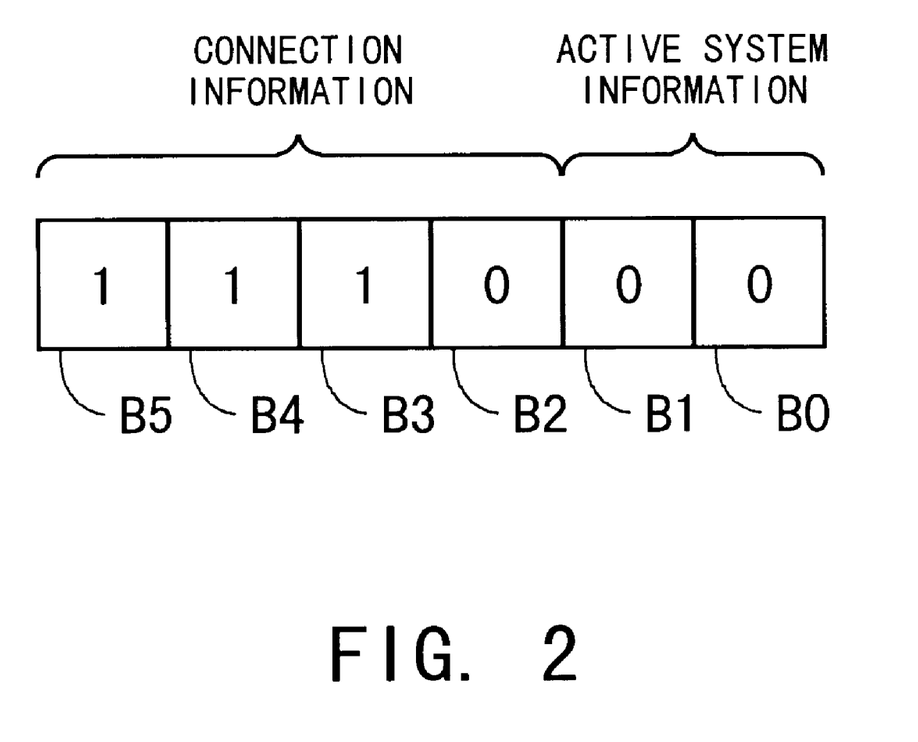
FIG. 2 is a diagram of a control register in the information processing apparatus shown in FIG. 1.

The control registers $1c$, $1d$ hold information relative to the storage devices 10–13. FIG. 2 schematically shows the control registers $1c$, $1d$. As shown in FIG. 2, each of the control registers $1c$, $1d$ comprises 6 bits ranging from B0 to B5. The 4 high-order bits of the 6 bits represent connection information indicating how the storage devices are connected, and the 2 low-order bits of the 6 bits represent active system information indicating a storage device in an active system.

The bits B5–B2 of the connection information correspond respectively to the storage devices 10–13. If each of the bits B5–B2 is "0", then it indicates that the corresponding storage device is not connected. In the example shown in FIG. 2, since all the bits B5–B3 are "1", all the storage devices 10–12 are connected.

The active system information has an LSB (Least Significant Bit) represented by the bit B0. A storage device corresponding to a value (one of the values 0–3 according to the decimal notation) represented by the 2 bits of the active system information belongs to the active system. Stated otherwise, a storage device whose reference numeral's first figure is equal to the decimal value of the active system information belongs to the active system. In the example shown in FIG. 2, since the bits B1, B0 are "00", respectively, the storage device 10 is selected as the active system. If the bits B1, B0 are "01", "10", "11", then the respective storage devices 11, 12, 13 are selected as the active system.

In FIG. 1, the bus 3 interconnects the nodes 1, 2 and the control devices 4–7 for allowing information to be sent and received therebetween.

The control devices 4–7 control the reading of data from and the writing of data in the storage devices 10–13, and indicate a failure of the storage devices 10–13 to the nodes 1, 2.

Figure 3:
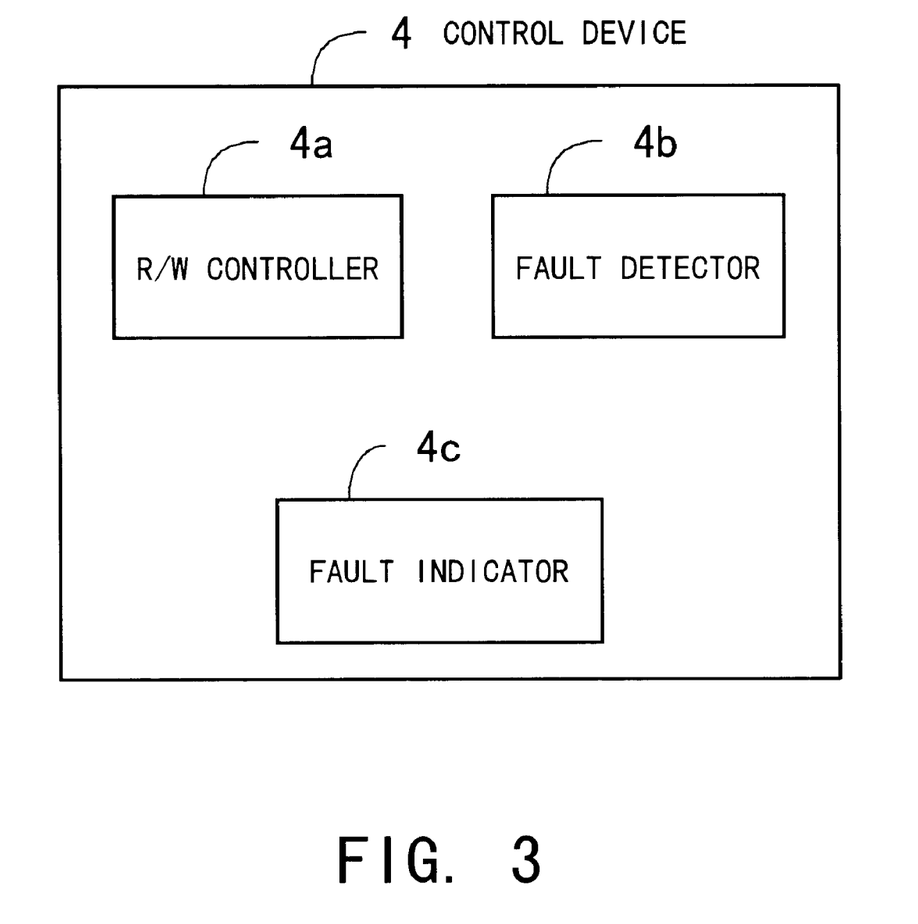
FIG. 3 is a diagram of a control device in the information processing apparatus shown in FIG. 1.

FIG. 3 shows details of the control device 4. Since the control devices 4–7 are identical in structure to each other, only the control device 4 will be described below, and the control devices 5–7 will not be described in detail below.

The control device 4 comprises a R/W (Read/Write) controller 4a, a fault detector 4b, and a fault indicator 4c. The R/W controller 4a performs a control process for writing data in and reading data from the storage device 10.

When the storage device 10 suffers a fault, the fault detector 4b detects such a fault of the storage device 10.

When fault detector 4b detects a fault, the fault indicator 4c indicates the fault to the control devices 5–7.

The storage devices 10–13 comprise a semiconductor memory, for example, and write data in a given area and read data from a given area under control of the control devices 4–7.

The storage devices 10, 11 serve as a pair, and store the same contents. Similarly, the storage devices 12, 13 serve as a pair, and store the same contents. The contents stored by the storage devices 10, 11, and the contents stored by the storage devices 12, 13 are partly different from each other. The pairs of the storage devices 10, 11 and the storage devices 12, 13 are referred to as "sets". The set of the storage devices 10, 11 is called a lower-level set, and the set of the storage devices 12, 13 is called an higher-level set.

Operation of the information processing apparatus will be described below with reference to FIG. 4.

Figure 4:
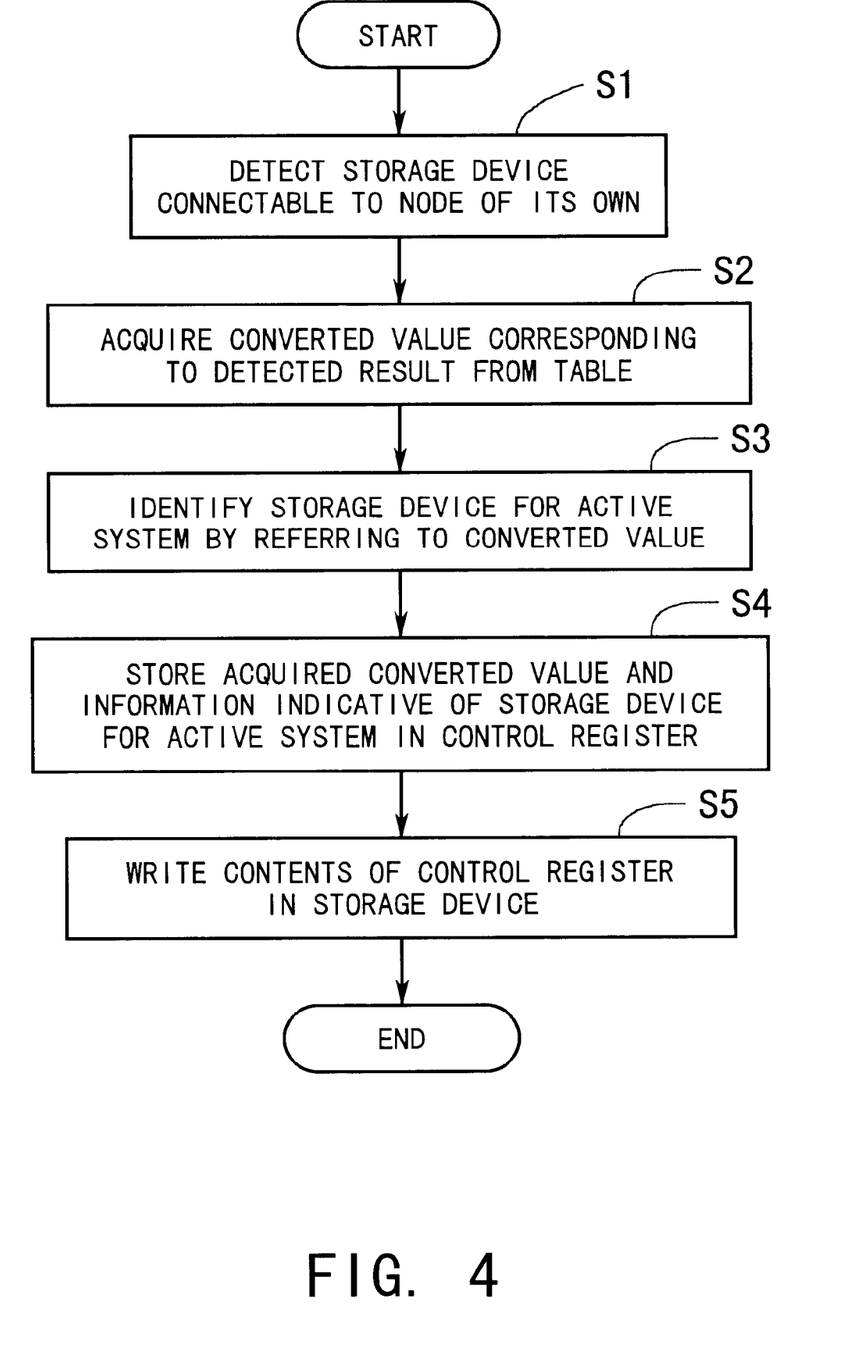
FIG. 4 is a flowchart of a program executed by a CPU which is activated at first when the information processing apparatus shown in FIG. 1 is activated.

FIG. 4 shows a startup sequence which is executed when the information processing apparatus shown in FIG. 1 is activated. The startup sequence is executed by a CPU which is activated at first when the information processing apparatus is activated. It is assumed here that the CPU 1a is activated at first. In FIG. 4, numerals with a prefix "S" represent steps of the startup sequence.

[S1] The CPU 1a detects a storage device that can be connected to the node of its own, by executing a predetermined command.

[S2] The CPU 1a acquires a converted value corresponding to the detected result in step Si from a table stored in the memory 1e.

Figure 5:
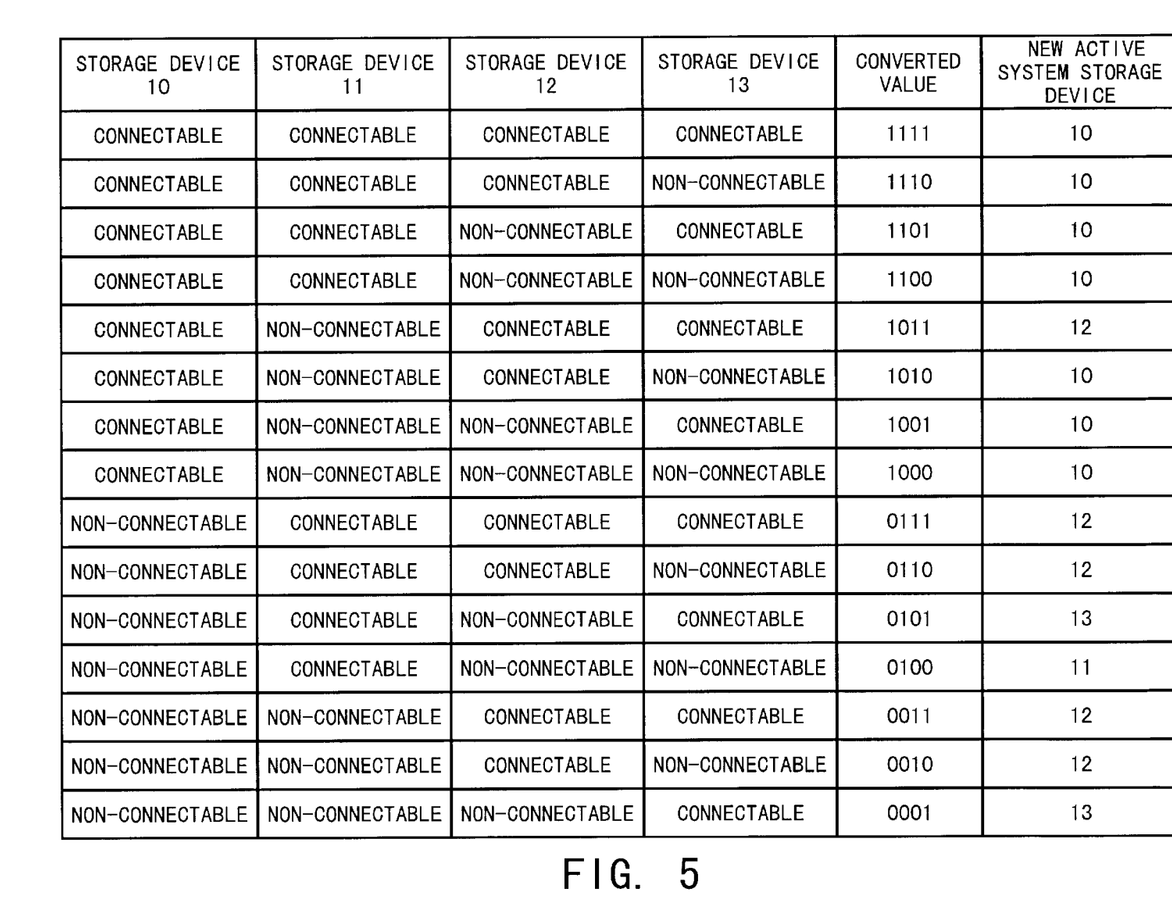
FIG. 5 is a table for determining a storage device in an active system which is referred to in the flowchart shown in FIG. 4.

FIG. 5 shows such a table stored in the memory 1e. The table shown in FIG. 5 shows converted values and storage devices in a new active system which correspond to connectable and non-connectable states of the storage devices 10–13. For example, in an example given by the first row, all the storage devices 10–13 are connectable, the converted value (the connectable and non-connectable states of the storage devices 10–13 as represented by "1" and "0", respectively) is "1111", and a storage device in the new active system is the storage device 10.

The new active system is selected according to the following rules: The lower-level set and the higher-level set are successively reviewed, and the first set of storage devices both of which are connectable is selected. The lower one of the storage devices of the selected set is selected as the active system (the storage device 10 is lower and the storage device 13 is higher). If there is no set of storage devices both of which are connectable, then the lower-level set and the higher-level set are successively reviewed, and if there is a set of storage devices whose lower one is connectable, then the connectable lower storage device is selected. If there is no set of storage devices whose lower one is connectable, then the higher-level set and the lower-level set are successively reviewed, and if there is a set of storage devices whose higher one is connectable, then the connectable higher storage device is selected.

Since the contents stored by the sets of storage devices are partly different from each other, as described above, when a set of storage devices one of which is faulty is selected as the active system, the different information that is stored is deleted in its entirety if the other storage device suffers a fault. The set of storage devices both of which are connectable is selected with priority in order to avoid the deletion of the different information.

[S3] The CPU 1a acquires information for identifying the storage device in the active system from a given address designated when the acquired converted value is used as an offset value.

For example, when the converted value is "1111", information "00" (i.e., the storage device 10) stored in an address corresponding to an address value produced by adding a given base address value to "1111" is obtained. Therefore, the storage device 10 is selected as the new active system.

[S4] The CPU 1a stores the obtained converted value as connection information in the control register 1c, and also stores information indicative of the new active system as active system information in the control register 1c.

[S5] The CPU 1a writes the contents of the control register 1c via the bus 3 in given areas of all the connected storage devices.

Therefore, when the information processing apparatus is activated, the CPU that is activated at first executes the above processing sequence to detect connection statuses of the storage devices, and determines a storage device for the active system. The obtained value (register value) is written in given areas of all the connected storage devices. If another CPU is subsequently activated, then it acquires information stored in the storage devices and stores the acquired information in the register of its own. Therefore, at the time all the CPUs are activated, the contents stored in the respective control registers are identical to each other.

Figure 6:
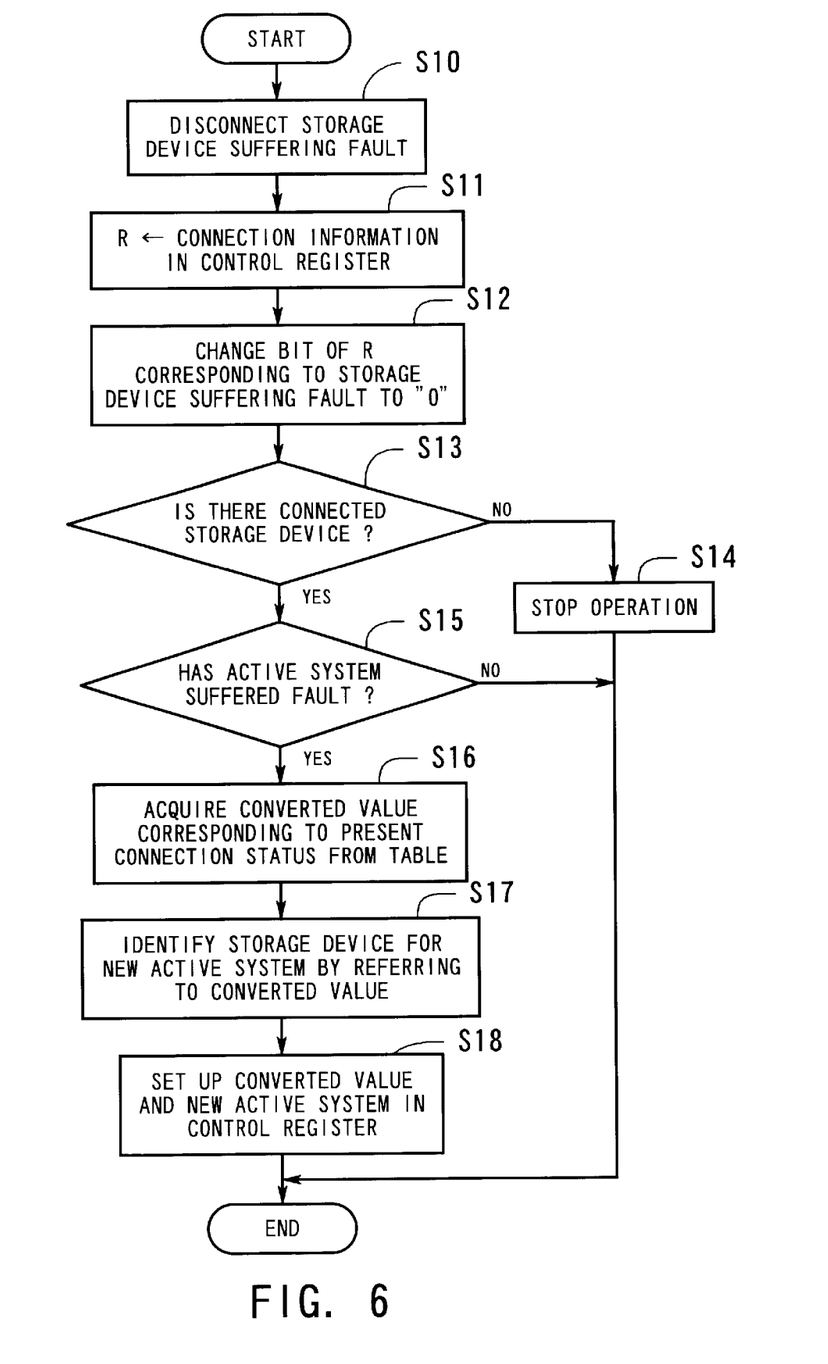
FIG. 6 is a flowchart of a processing sequence which is executed if a CPU has accessed a storage device when the storage device has suffered a fault.

A processing sequence which is executed when a storage device has suffered a failure will be described below with reference to FIG. 6. The processing sequence shown in FIG. 6 is executed if a CPU has accessed a storage device and when the control device indicates a failure of the storage device.

Specifically, if either one of the storage devices suffers a fault, the fault detector 4b (see FIG. 3) of the control device corresponding to the storage device detects the fault, and the fault indicator 4c thereof indicates the fault to all the control devices. As a result, the occurrence of the fault is indicated irrespective of whether the CPU has accessed the storage device for reading data or writing data. Upon indication of the fault, the CPU carries out the processing sequence shown in FIG. 6.

The control device has the fault indicator for the following reasons: Inasmuch as the CPU writes data in all the storage devices connected thereto, the CPU can detect when either one of the connected storage devices suffers a fault.

Since the CPU reads data from only the storage device in the active system, the CPU is unable to detect when a storage device not in the active system becomes faulty. In order to allow the CPU to detect such a storage device fault, the fault indicator is employed to indicate a fault of any one of the storage devices to other storage devices.

It is assumed that the CPU 1*a* executes the processing sequence shown in FIG. 6. In FIG. 6, numerals with a prefix "S" represent steps of the processing sequence.

[S10] The CPU 1*a* disconnects a storage device which has suffered a fault.

[S11] The CPU 1*a* stores the connection information in the control register 1*c* in a variable R.

[S12] The CPU 1*a* changes the bit corresponding to the faulty storage device to "0".

For example, when the present connection information is "1111", if the storage device 10 suffers a fault, then the connection information is changed to "0111".

[S13] The CPU 1*a* refers to the changed connection information and determines whether there is a connected storage device or not. If there is a connected storage device, then control goes to step S15. Otherwise, control goes to step S14. That is, if all the bits of the connection information are "0", then control goes to step S14, and otherwise, control goes to step S15.

[S14] The CPU 1*a* determines that continued operation of the information processing apparatus is impossible, and stops operation thereof.

[S15] The CPU 1*a* refers to the active system information in the control register 1*c*, and determines whether the faulty storage device has been selected as the active system or not. If the faulty storage device has been selected as the active system, then control proceeds to step S16. Otherwise, the processing sequence is ended.

[S16] The CPU 1*a* acquires a converted value corresponding to the connection statuses of the storage devices from a table.

Figure 7:
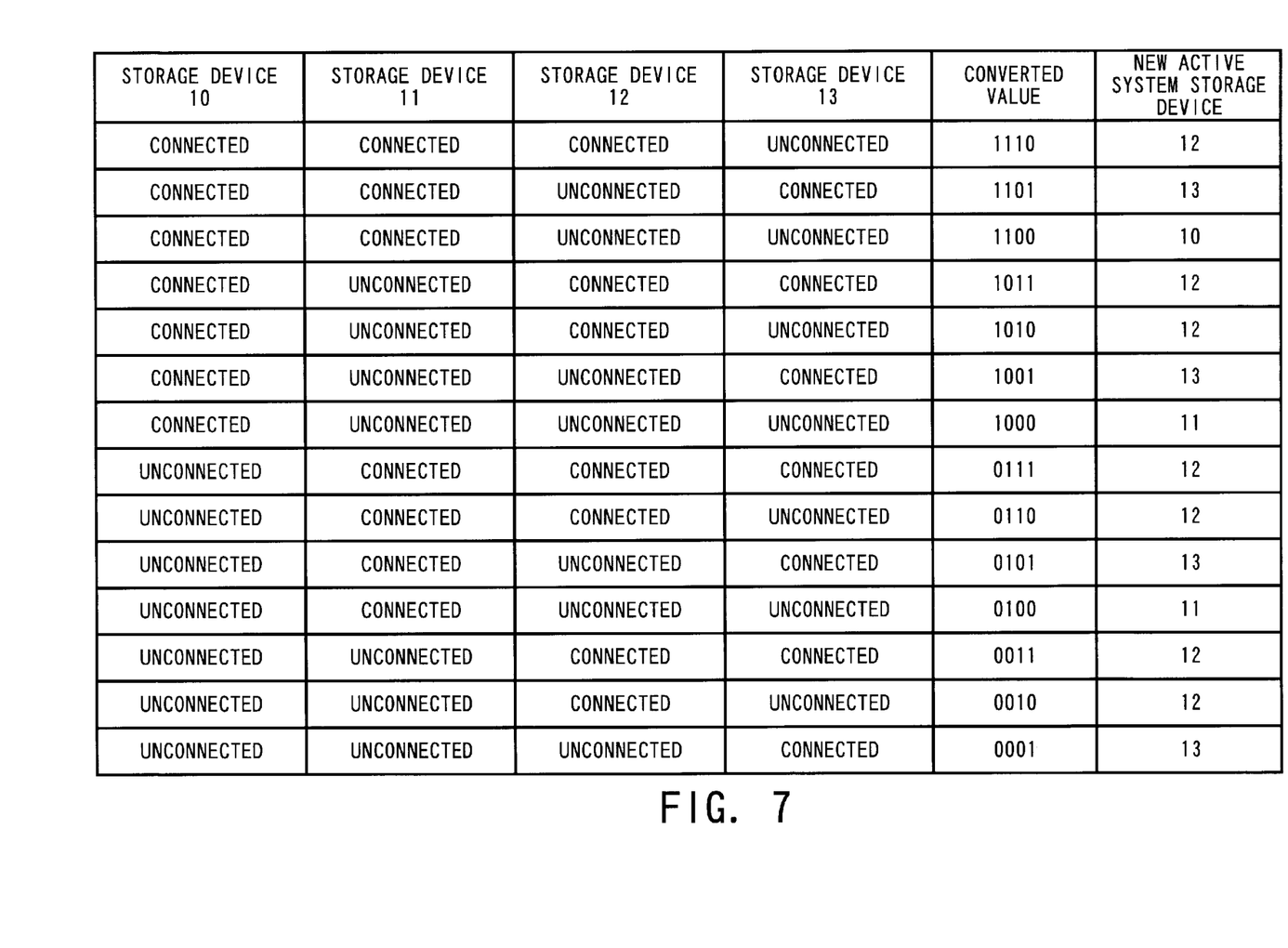
FIG. 7 is a table for determining a storage device in the active system which is referred to in the flowcharts shown in FIGS. 6 and 9.

FIG. 7 shows such a table which indicates the association between the connection statuses of the storage devices, converted values, and new active system storage devices. In FIG. 7, the connection statuses of the storage devices 10–13, converted values in the connection statuses, and new active system storage devices are illustrated. For example, if the storage devices 10–12 are connected and the storage device 13 is unconnected, then the converted value is "1110", and the new active system storage device is the storage device 12. The active system is selected according to the following rules:

(1) The active system is not changed unless the active system storage device suffers a fault.

(2) If the active system storage device suffers a fault, then the active system is basically shifted from the lower-level set to the higher-level set.

(3) A shift from the higher-level set to the lower-level set is permitted only if any storage devices of the higher-level set are unconnected.

(4) If any storage devices in a set are connected, a storage device denoted by an even number is selected as the active system.

[S17] The CPU 1*a* identifies the storage device to be newly selected for the active system from the table shown in FIG. 7 by referring to the converted value acquired in step S16.

[S18] The CPU 1*a* stores the converted value acquired in step S16 as connection information in the control register 1*c*, and stores the information acquired in step S17 as active system information in the control register 1*c*.

The above processing sequence is executed when each CPU has accessed the storage device. When all the CPUs have accessed the storage device, the contents stored in the control registers are identical to each other, and the switching to the active system is completed.

As described above, at the time an individual CPU has accessed the storage device, the contents stored in the control register of the CPU are changed, and the switching to the active system is performed. Therefore, if another storage device suffers a fault while a CPU is executing the above processing sequence, then since the same processing sequence is repeated when each CPU has accessed the storage device, it is possible to prevent the CPU from accessing a wrong active system.

Figure 8:
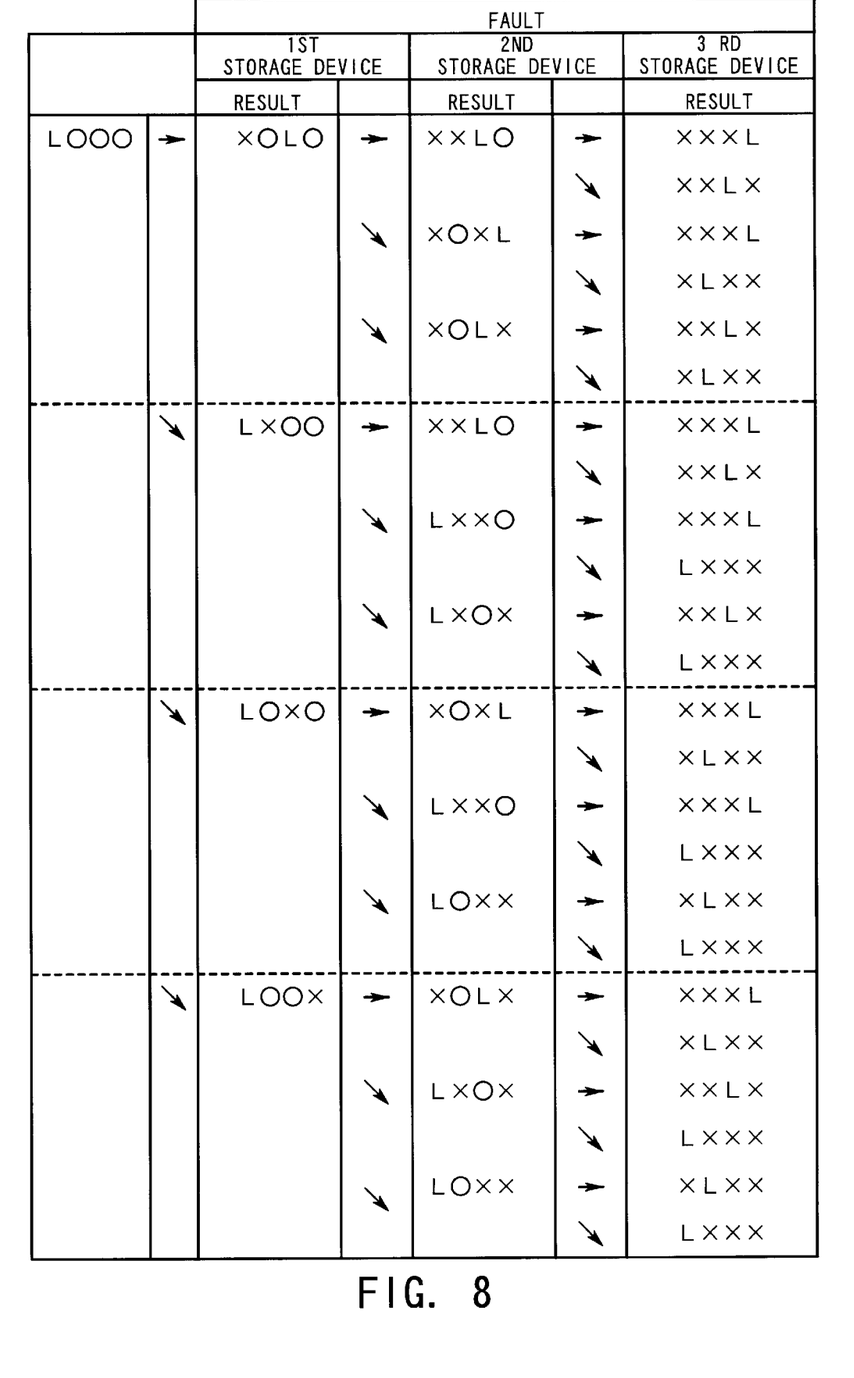
FIG. 8 is a diagram showing the manner in which an active system storage device is selected when three storage devices become successively faulty.

FIG. 8 shows the manner in which an active system storage device is selected when three storage devices become successively faulty. In FIG. 8, "L" indicates an active system, "O" a connected state, and "x" an unconnected state.

If the storage device 10 suffers a fault when the initial connection status is "LOOO", then the connection status becomes "xOOO". As indicated by the 8th row in FIG. 7, the storage device 12 is selected as the active system, and the connection status becomes "xOLO".

If the storage device 11 then suffers a fault as a second faulty device, then connection status becomes "xx OO", and as indicated by the 12th row in FIG. 7, the storage device 12 is selected as the active system, and the connection status becomes "xxLO".

If the storage device 12 then suffers a fault as a third faulty device, then connection status becomes "xxxO", and as indicated by the 14th row in FIG. 7, the storage device 13 is selected as the active system, and the connection status becomes "xxxL".

In other cases, the connection status changes as shown in FIG. 8.

Therefore, irrespective of the sequence in which the storage devices become faulty, it is possible to uniquely determine a storage device to be selected as the active system.

Because all the CPUs operate based on the same processing sequence, it is possible for the entire information processing apparatus to use a uniformized active system.

Figure 9:
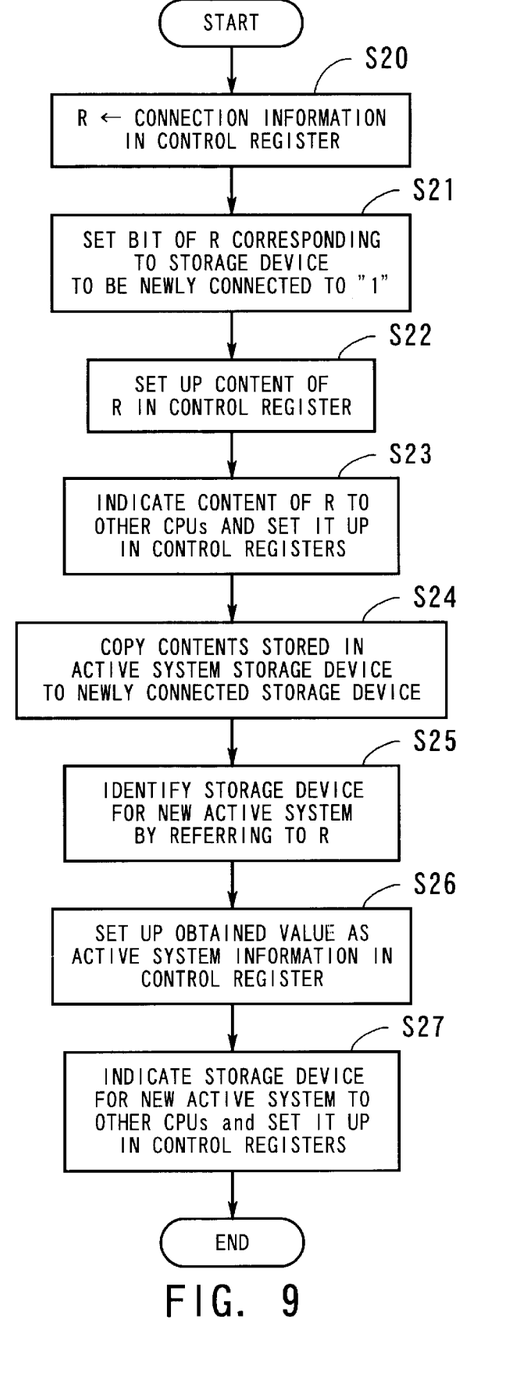
FIG. 9 is a flowchart of a processing sequence which is carried out when a storage device is newly connected.

A processing sequence which is carried out when a storage device is newly connected will be described below with reference to FIG. 9. The processing sequence shown in FIG. 9 is carried out by a CPU which has received a command for connecting a new storage device from an input device (not shown). The command entered from the input device is sent to a suitable node by an interrupt process, and executed by either one of the CPUs of the node. It is assumed that the CPU 1*a* executes the processing sequence shown in FIG. 9. In FIG. 9, numerals with a prefix "S" represent steps of the processing sequence.

[S20] The CPU 1*a* substitutes the connection information in the control register 1*c* in the variable R.

[S21] The CPU 1*a* sets the bit of the variable R corresponding to a storage device to be newly connected to "1".

[S22] The CPU 1*a* stores the content of the variable R as connection information in the control register 1*c*.

[S23] The CPU 1*a* indicates the content of the variable R to other CPUs, allowing it to be set up as connection information in the control registers of the respective CPUs.

The CPU 1a indicates the content of the variable R to the CPU 1b in the same node, and indicates the content of the variable R to the other CPUs 2a, 2b via a communication bus (not shown).

[S24] The CPU 1a copies the contents stored in the active system storage device to the newly connected storage device.

[S25] The CPU 1a refers to the content of the variable R to identify the storage device that will serve as the new active system.

Specifically, the CPU 1a refers to the table shown in FIG. 5 to identify the storage device of the active system corresponding to the value of the variable R. The table shown in FIG. 5 corresponds to the four connected storage devices 10–13. If the number of storage devices is to increase from 4 to 6, then it is necessary to prepare a table which corresponds to the six connected storage devices. Such a table can easily be produced according to the rules described above.

[S26] The CPU 1a sets up the value obtained in step S25 as active system information in the control register 1c.

[S27] The CPU 1a indicates the value obtained in step S25 to the other CPUs, allowing it to be set up as active system information in the control registers of the respective CPUs.

The process of indicating the value obtained in step S25 to the other CPUs is the same as described above in step S23.

According to the above processing sequence, it is possible to establish an active system reliably even when a storage device is newly connected.

In the above embodiment, the information processing apparatus has two nodes each having two CPUs and four storage devices 10–13. However, the present invention is not limited to such a configuration.

While each of the storage devices is associated with one control device in the above embodiment, the storage devices may be associated with a unified control device.

According to the present invention, as described above, an information processing apparatus having a plurality of nodes each having at least one CPU and multiplex storage devices comprises memory means associated with each of the CPUs for storing information indicating that each of the multiplex storage devices is either an active system, a backup system, or unconnected, access means for accessing the memory means depending on information stored in the memory means, fault detecting means for detecting when a fault occurs in each of the multiplex storage devices, fault indicating means for indicating the occurrence of a fault to a CPU if the fault detecting means detects the occurrence of the fault and the CPU has accessed the fault indicating means, and updating means for updating information stored in the memory means according to predetermined rules if the fault indicating means has indicated the occurrence of the fault. Therefore, the reliability of the information processing apparatus can be increased.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information processing apparatus having a plurality of nodes each having at least one CPU and multiplex storage devices, comprising: memory means associated with each of the CPUs for storing information indicating that each of the multiplex storage devices if either an active system, a backup system, or unconnected:

access means for accessing the memory means depending on information stored in the memory means:

fault detecting means for detecting when a fault occurs in each of the multiplex storage devices:

fault indicating means for indicating the occurrence of a fault to a CPU if the fault detecting means detects the occurrence of the fault and the CPU has accessed the fault indicating means; and updating means for updating information stored in the memory means according to predetermined rules if the fault indicating means has indicated the occurrence of the fault;

wherein said storage devices include a plurality of pairs of storage devices, each pair of storage devices storing identical information, said updating means including means for, if the active system having a pair of storage devices suffers a fault, changing the backup system of another pair of storage devices to the active system:

the information processing apparatus further comprising startup setting means for setting up the information stored in the memory means according to predetermined rules when the information processing apparatus is activated, said startup setting means including means for, if there is a pair of storage devices both of which are not unconnected, selecting said pair of storage devices with priority and setting up either one of said storage devices as the active system.

2. An information processing apparatus according to claim 1, wherein said updating means comprises means for changing the backup system to the active system only if a storage device suffering a fault is the active system.

3. An information processing apparatus according to claim 1, wherein said updating means comprises means for updating the information stored in the memory means according to a table containing said predetermined rules.

4. An information processing apparatus having a plurality of nodes each having at least one CPU and multiplex storage devices, comprising:

memory means associated with each of the CPUs for storing information indicating that each of the multiplex storage devices if either an active system, a backup system, or unconnected;

access means for accessing the memory means depending on information stored in the memory means;

fault detecting means for detecting when a fault occurs in each of the multiplex storage devices;

fault indicating means for indicating the occurrence of a fault to a CPU if the fault detecting means detects the occurrence of the fault and the CPU has accessed the fault indicating means; and updating means for updating information stored in the memory means according to predetermined rules if the fault indicating means has indicated the occurrence of the fault;

wherein said storage devices include a plurality of pairs of storage devices, each pair of storage devices storing identical information, said updating means including means for, if the active system having a pair of storage devices suffers a fault, changing the backup system of another pair of storage devices to the active system;

the information processing apparatus farther having connection setting means for setting up the information stored in the memory means according to predetermined rules when a new storage device is connected, said connection setting means including means for, if there is a pair of storage devices both of which are not unconnected, selecting said pair of storage devices with priority and setting up either one of said storage devices as the active system.

5. An information processing apparatus according to claim 4, wherein said updating means comprises means for changing the backup system to the active system only if a storage device suffering a fault is the active system.

6. An information processing apparatus according to claim 4, wherein said updating means comprises means for updating the information stored in the memory means according to a table containing said predetermined rules.

* * * * *

UNITED STATES PATENT AND TRADEMARK OFFICE
CERTIFICATE OF CORRECTION

PATENT NO. : 6,745,341 B1
DATED : June 1, 2004
INVENTOR(S) : Onitsuka et al.

It is certified that error appears in the above-identified patent and that said Letters Patent is hereby corrected as shown below:

Column 8,
Line 22, after "active" delete "system:" and insert -- system; --.

Signed and Sealed this

Thirty-first Day of August, 2004

JON W. DUDAS
*Director of the United States Patent and Trademark Office*